US012132337B1

(12) United States Patent
Xu

(10) Patent No.: US 12,132,337 B1
(45) Date of Patent: Oct. 29, 2024

(54) VEHICLE CIGARETTE LIGHTER ADAPTER (CLA) WITH FAN AND USB CHARGE

(71) Applicant: SHENZHEN IBOOSTEK CO., LIMITED, Guangdong (CN)

(72) Inventor: Gang Xu, Wuhan (CN)

(73) Assignee: SHENZHEN IBOOSTEK CO., LIMITED, Shenzhen (CN)

( * ) Notice: Subject to any disclaimer, the term of this patent is extended or adjusted under 35 U.S.C. 154(b) by 0 days.

(21) Appl. No.: 18/399,627

(22) Filed: Dec. 28, 2023

(30) Foreign Application Priority Data

Dec. 8, 2023 (CN) .......................... 202323344775.4

(51) Int. Cl.
*H02J 7/00* (2006.01)

(52) U.S. Cl.
CPC .................................. *H02J 7/0044* (2013.01)

(58) Field of Classification Search
CPC ..................................................... H02J 7/0044
USPC ................. 320/107, 111; 307/9.1–10.1; 361/679.46–679.51, 688–697, 748, 752
See application file for complete search history.

(56) References Cited

U.S. PATENT DOCUMENTS

| 9,399,080 | B2* | 7/2016 | Irvin | A61L 9/032 |
| 10,034,953 | B2* | 7/2018 | Bourne | B01F 23/215 |
| 10,940,226 | B2* | 3/2021 | Koontz | A01M 1/2077 |
| 10,994,042 | B2* | 5/2021 | Westphal | A01M 1/2077 |
| 11,083,812 | B2* | 8/2021 | Young | B60H 3/0014 |
| 2016/0022857 | A1* | 1/2016 | Esses | A61L 9/03 392/390 |

FOREIGN PATENT DOCUMENTS

CN 206099418 U * 4/2017

* cited by examiner

*Primary Examiner* — Richard V Muralidar

(57) ABSTRACT

A Vehicle Cigarette Lighter Adapter (CLA) with Fan and USB Charger comprises a charger body; wherein the charger body comprises: a shell with an opening on the top, a fixed cover which is disposed at the opening of the shell, a plurality of first heat emission holes running through the fixed cover, and a control circuit board and an adapter board which are arranged in the shell from top to bottom; wherein the adapter board is provided with several charging interfaces. There are gaps between the adapter board and the inner side wall of the shell and between the control circuit board and the inner side wall of the shell, which greatly improves the heat emission efficiency and helps to reduce the temperature of the charger body.

6 Claims, 4 Drawing Sheets

VEHICLE CIGARETTE LIGHTER ADAPTER (CLA) WITH FAN AND USB CHARGE

TECHNICAL FIELD

The present utility patent relates to the technical field of vehicle charger technology, and in particular, for a vehicle cigarette lighter adapter (CLA) with fan and USB charger.

BACKGROUND

As we all know, a vehicle charger, which is suitable for vehicle cigarette lighter jack, comprises one or more USB interfaces. It can charge one or two digital products (such as mobile phones, bluetooth earphones charging base, etc.) via a data cable at the same time. When the vehicle charger charges electronic devices, it will generate some heat. As the charging power of electronic products such as mobile phones and computers on the market is getting higher and higher, the charger is easier to generate heat when charging, and due to the shell of the vehicle chargers currently on the market are usually integrated, there is no heat emission structure to allow the heat of the shell to emit, which easily causes the charger to heat up during use and reduce the output power, so that the full charging time of electronic products only lasts 5-20 minutes, and there is a problem of not being able to work at full load for a long time, so it needs to be improved.

SUMMARY OF THE PRESENT UTILITY PATENT

Aiming at the defects and deficiencies of the prior art, a vehicle cigarette lighter adapter (CLA) with fan and USB charger adopting in the present utility patent comprises: first heat emission holes and second heat emission holes which are respectively arranged on the fixed cover and the shell of the charger body, and a cooling fan in the shell to greatly improve the heat emission efficiency, which helps reduce the temperature of the charger body and prevents the charger body from overheating to cause reducing the charger body's output power, thereby achieving the advantage of extending the charger body's full-load charging time.

To realize the above purposes, the technical solutions adopted by the present utility patent are: a vehicle cigarette lighter adapter (CLA) with fan and USB charger comprises a charger body to use with a vehicle cigarette lighter jack; wherein the charger body comprises: a shell with an opening on the top, a fixed cover which is disposed at the opening of the shell, a plurality of first heat emission holes which are provided to run through the fixed cover, and a control circuit board and an adapter board which are arranged in the shell from top to bottom, wherein the adapter board is provided with several charging interfaces; the several charging interfaces pass through the side of the shell close to the fixed cover and/or through the fixed cover; there are gaps between the adapter board and the inner side wall of the shell and between the control circuit board and the inner side wall of the shell.

The shell comprises: a connecting shell that can be inserted into the vehicle cigarette lighter jack; a limited shell is integrally provided on the top of the connecting shell and is used to limit at the outside of the vehicle cigarette lighter jack; the fixed cover covers the opening at the top of the limited shell, and a plurality of second heat emission holes are annularly penetrated on the bottom of the limited shell, the adapter board is fixedly installed in the limited shell, and the control circuit board extends into connecting shell from the limited shell.

The vehicle cigarette lighter adapter (CLA) with fan and USB charger further comprises a cooling fan which is arranged in the shell, wherein the cooling fan is electrically connected to the control circuit board, and the air outlet of the cooling fan faces to one side of the first heat emission holes.

The cooling fan is arranged in the limited shell and is located above the adapter board, a cavity is arranged between the cooling fan and the adapter board to connect with the gap between the adapter board and the limited shell.

A fixed column is integrally arranged on the inner side wall of the limited shell, and the adapter board is fixed on the top of the fixed column, a limited slot penetrates the adapter board, a limited block is protruding upward on the top of the control circuit board for insertion into the limited slot.

The bottom of the connecting shell is provided with an input electrode to use with the vehicle cigarette lighter jack to realize power input.

A plurality of the charging interfaces respectively pass through the fixed cover and the limited shell.

At least two fixed columns are provided at intervals on the inner side wall of the limited shell, and a connecting piece is provided between the fixed columns and the limited shell.

A locking slot is arranged on one side of the inner side wall of the limited shell which is close to the opening, and a locking piece is arranged on the outer side wall of the fixed cover to snap with the locking slot.

Adopting the above technical solutions, the beneficial effect of the present utility patent is:

1. A plurality of first heat emission holes are arranged on the fixed cover on the top of the shell. The configuration of the first heat emission holes facilitates the heat emission of the vehicle charger, thereby facilitating the cooling of the vehicle charger body and reducing the heat in the shell which is generated by the charger body and is difficult to emit so leads to the problem of being unable to meet full load work for a long time.

2. The cooling fan is located above the adapter board, and the air outlet of the cooling fan faces to the first heat emission holes. When the cooling fan is working, the cold air can enter from the second heat emission holes and take away the heat generated by the control circuit board and the adapter board, so that the heat successively passes through the gap between the shell and the control circuit board, the gap between the limited shell and the adapter board, the air inlet of the cooling fan, the air outlet of the cooling fan and the first heat emission holes, and then is discharged outside, which can further emit the heat of the charger body, so that the vehicle charger can work at full load for a longer time.

BRIEF DESCRIPTION OF THE FIGURES

In order to more clearly illustrate the technical solutions of the embodiment or the prior art of the present utility patent, a brief introduction of the figures that need to be used in the embodiment or the description of the prior art will be given below, apparently, the figures in the following description are only some embodiments of the present invention, for those of general person skilled in the art, on the basis of no inventive efforts, other figures can also be obtained based on these figures.

Figure 1:
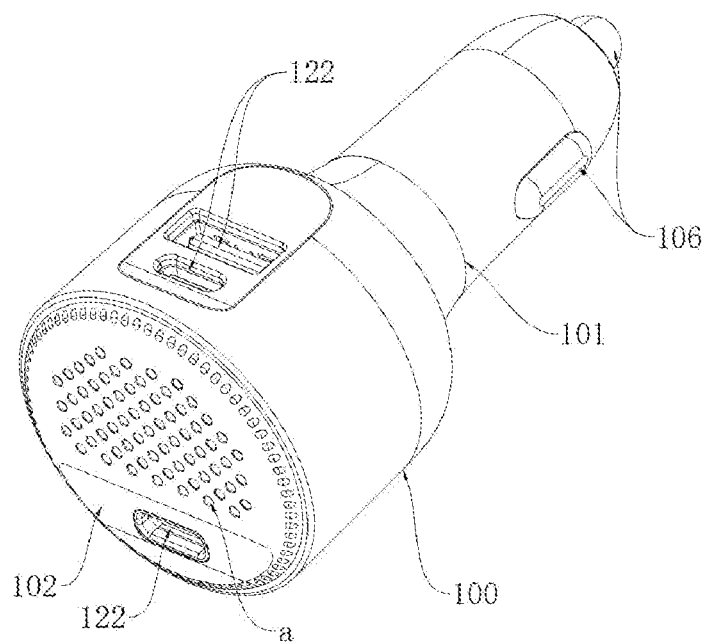
FIG. 1 is a structure schematic view of the present utility patent.

Reference signs in the figures: 100—charger body; 101—shell; 102—fixed cover; a—first heat emission hole; 111—control circuit board; 121—adapter board; 122—charging interface; 103—connecting shell; 104—limited shell; b—second heat emission hole; 131—cooling fan; 132—supporting leg; c—cavity; 105—fixed column; d—limited slot; 112—limited block; 106—input electrode; 107—connecting piece; e—locking slot; 108—locking piece.

DETAILED DESCRIPTION OF THE EMBODIMENTS

Below is a further detailed description of the present utility patent based on the figures.

The present embodiment only shows an explanation of the present utility patent and it is not a limitation to the present utility patent. The skilled in the art can make modifications to this embodiment as needed without making any creative contributions after reading this specification, which are always protected by the patent law as long as they are within the scope of the claims of the present utility patent.

It should be noted that when an element is called as being "fixed to" or "arranged on" another element, it can be directly on the other element or indirectly on the other element. When an element is called as being "connected to" another element, it can be directly connected to the other element or indirectly connected to the other element.

It should be noticed that the terms "length", "width", "top", "bottom", "front", "rear", "left", "right", "vertical", "horizontal", "top", "bottom", "inside" and "outside" which indicates the orientations or positional relationships are based on the orientations or positional relationships shown in the figures. They are only for facilitating describing the present invention and simplifying the description, rather than indicating or implying that the device or component must have a specific orientation, construct and operate in a specific orientation, therefore, it understood as a limitation of the present invention.

In addition, the terms "first" and "second" are used for descriptive purposes only and cannot be understood as indicating or implying relative importance or implicitly indicating the quantity of indicated technical features. Therefore, a feature defined as "first" and "second" may explicitly or implicitly include one or more of these features. In the description of the present invention, "a plurality of" means two or more, unless otherwise specifically defined.

This embodiment relates to a vehicle cigarette lighter adapter (CLA) with fan and USB charger, referring to FIGS. 1-6, comprising a charger body 100 to use with a vehicle cigarette lighter jack. The charger body 100 comprises: a shell 101, a fixed cover 102, a control circuit board 111 and an adapter board 121. The shell 101 is provided with an opening on the top; the fixed cover 102 is disposed at the opening of the shell 101, a plurality of first heat emission holes a are provided to run through the fixed cover 102; the control circuit board 111 and the adapter board 121 are arranged in the shell 101 from top to bottom and are electrically connected through wires. The adapter board 121 is provided with several charging interfaces 122; wherein the several charging interfaces 122 pass through the side of the shell 101 close to the fixed cover 102 and/or through the fixed cover 102; there are gaps between the adapter board 121 and the inner side wall of the shell 101 and between the control circuit board 111 and the inner side wall of the shell 101. The rear part of the shell 101 is provided with an input electrode 106 that is in contact with the connection terminal in the vehicle cigarette lighter jack to realize electrical connection between the vehicle charger and the vehicle cigarette lighter jack. The input electrode 106 is electrically connected to the control circuit board 111. In some embodiments, the charging interface 122 includes a USB interface. In some embodiments, the charging interface 122 includes a USB interface and a Type-C interface.

It should be noted that a plurality of first heat emission holes a are arranged on the fixed cover 102 on the top of the shell 101. The configuration of the first heat emission holes a facilitates the heat emission of the vehicle charger, thereby facilitating the cooling of the vehicle charger body 100 and reducing the heat in the shell which is generated by the charger body and is difficult to emit so leads to the problem of being unable to meet full load work for a long time.

Figure 2:
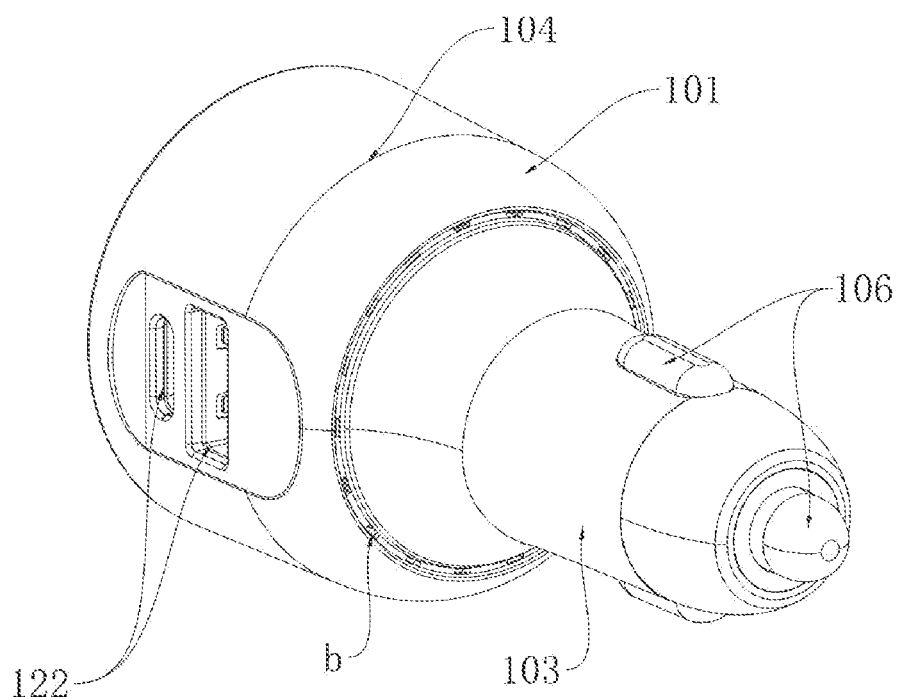
FIG. 2 is a structure schematic view of another direction of the present utility patent.
Figure 3:
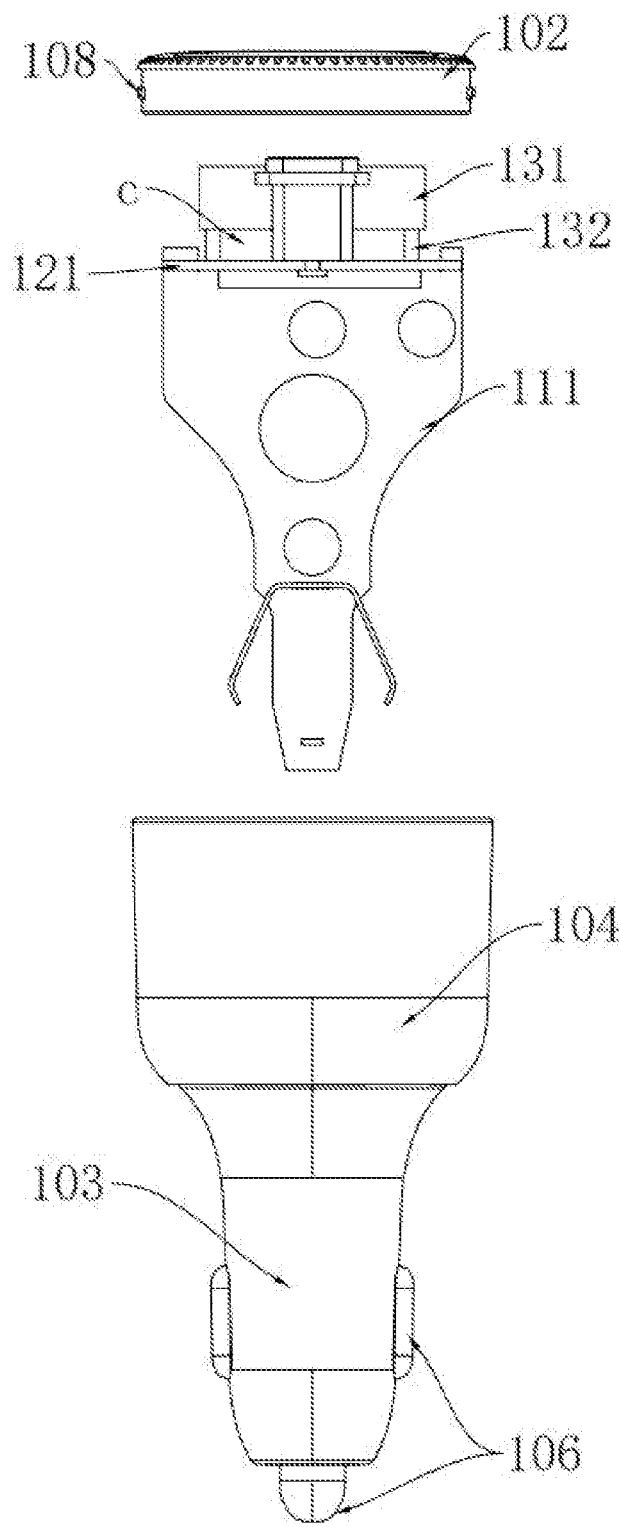
FIG. 3 is an exploded view of the present utility patent.
Figure 4:
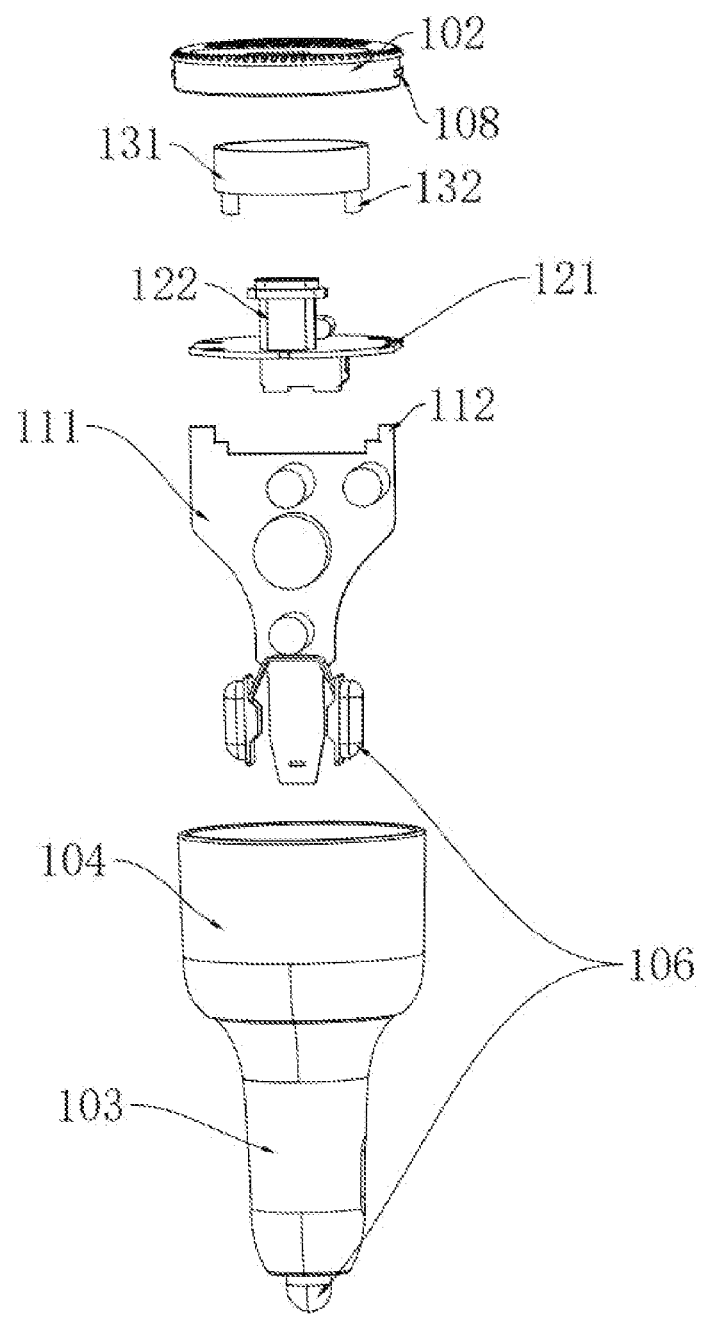
FIG. 4 is another exploded view of the present utility patent.

Optionally, in order to further facilitate the heat emission of the vehicle charger, referring to FIGS. 2-4, the shell 101 comprises: a connecting shell 103 and a limited shell 104. The connecting shell 103 can be inserted into a vehicle cigarette lighter jack. The limited shell 104 is integrally arranged on the top of the connecting shell 103. The limiting shell 104 is used to limit at the outside of the vehicle cigarette lighter jack. The fixed cover 102 covers the opening at the top of the limited shell 104. The bottom of the limited shell 104 is annularly penetrated with a plurality of second heat emission holes b. The second heat emission holes b are provided on the bottom of the limited shell 104, which realizes communication between the outside and the inside of the shell 101, thereby further facilitating the heat emission of the vehicle charger body 100. The adapter board 121 is fixedly arranged in the limited shell 104 to realize the charging interface 122 is exposed in the vehicle cigarette lighter jack, which facilitates the external electronic device is charged through the vehicle charger and the control circuit board 111 extends from the limited shell 104 into the connecting shell 103 when the vehicle charger is installed in the vehicle cigarette lighter jack. In this embodiment, the input electrode 106 is located on the bottom of the connecting shell 103, and the input electrode 106 is used with the vehicle cigarette lighter jack to realize power input. In one of the embodiments, a plurality of charging interfaces 122 are respectively penetrated through the fixed cover 102 and the limited shell 104. Optionally, the limited shell 104 and the connecting shell 103 are integrally formed.

It should be noted that the first heat emission holes a are arranged on the fixed cover 102, and the second heat emission holes b are arranged on the limited shell 104, so that the heat in the charger body 100 can be emitted outside through the first heat emission holes a and the second heat emission holes b, thereby reducing the problem of the output power of the charger body 100 being reduced due to the heat generated by the charger body 100.

Figure 5:
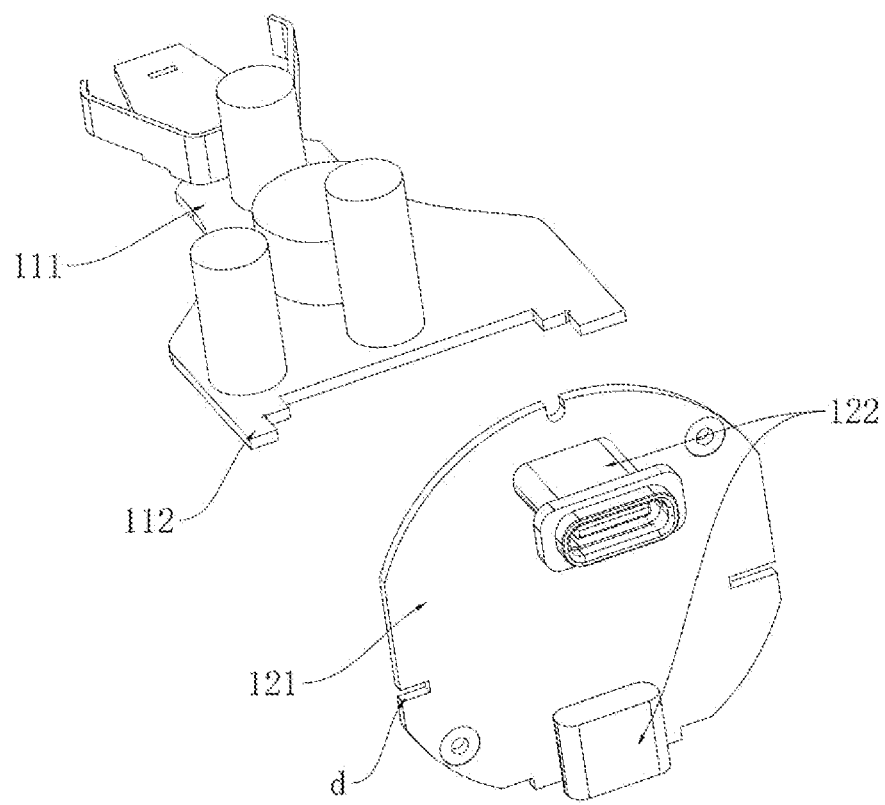
FIG. 5 is a schematic view of separation state of the control circuit board and the adapter board of the present utility patent.

Optionally, in order to further facilitate the heat emission of the vehicle charger, referring to FIGS. 3-5, the vehicle charger further comprises: a cooling fan 131. The cooling fan 131 is arranged in the shell 101 and is electrically connected to the control circuit board 111. The air outlet of the cooling fan 131 faces to one side of the first heat emission holes a. In one of the embodiments, the cooling fan 131 is disposed in the limited shell 104 and above the adapter board 121, and a cavity c is arranged between the cooling fan 131 and the adapter board 121 to connect the gap between the adapter board 121 and the limited shell 104. Optionally, a fixed column 105 is integrally arranged on the inner side wall of the limited shell 104, and the adapter board 121 is fixed on the top of the fixed column 105. A limited slot d runs through the adapter board 121, and a limited block 112 protrudes upward on the top of the control circuit board 111 to insert into the limited slot d. In one embodiment, two limited blocks 112 are provided, and the two limiting blocks 112 are arranged oppositely on the top of the control circuit board 111. Optionally, the adapter board 121 is perpendicular to the control circuit board 111. The cooling fan 131 and the adapter board 121 are fixed on the fixed column 105 through screws. Optionally, the cooling fan 131 is provided with a plurality of supporting legs 132 at intervals. The end of the supporting legs 132 away from the cooling fan 131 is fixed on the adapter board 121 so that a cavity c is formed between the cooling fan 131 and the adapter board 121 to connect with the gap, which prevents the air inlet of the cooling fan 131 from being blocked. The screws can pass through the cooling fan 131 and the supporting legs 132 in order to be fixed on the adapter board 121 or the fixed column 105. In one embodiment, at least two fixed columns 105 are arranged on the inner side wall of the limited shell 104 at intervals, and a connecting piece 107 is provided between the fixed column 105 and the limited shell 104. In one embodiment, the adapter board 121 is provided with mounting holes to correspond to the fixed columns 105 one-to-one. The fixed columns 105 can be inserted into the mounting holes to make the adapter board 121 be limited on the top surface of the connecting piece 107. The distance between the top surface of the supporting rod and the fixed rod is greater than the thickness of the adapter board 121. The cooling fan 131 is fixed on the fixed columns 105 through screws, so that a cavity c is formed between the adapter board 121 and the cooling fan 131.

It should be noted that the cooling fan 131 is located above the adapter board 121, and the air outlet of the cooling fan 131 faces to the first heat emission holes a. When the cooling fan 131 is working, the cold air can enter from the second heat emission holes b and sequentially take away the heat generated by the control circuit board 111 and the adapter board 121, so that the heat passes through the gap between the shell 101 and the control circuit board 111, the gap between the limited shell 104 and the adapter board 121, the air inlet of the cooling fan 131, the air outlet of the cooling fan 131 and the first heat emission holes a, and then is discharged to outside, which can further emit the heat of the charger body 100, thereby making the vehicle charger able to work longer at full load.

Figure 6:
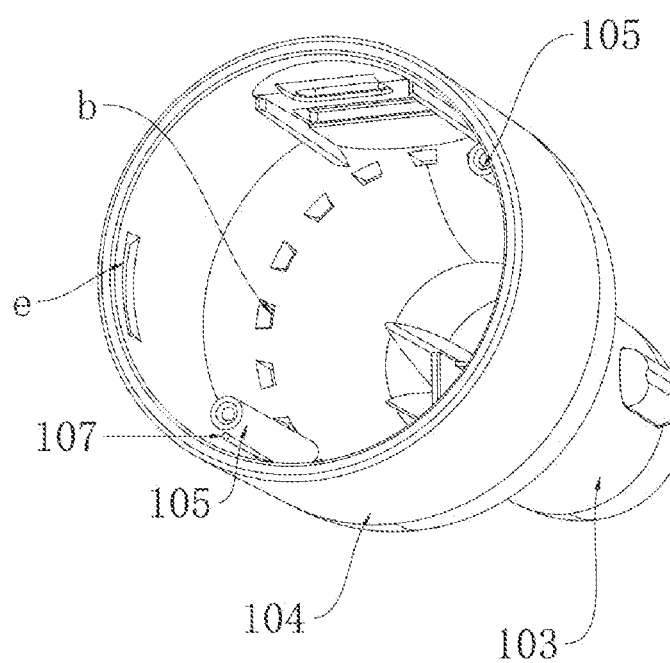
FIG. 6 is a structure schematic view of the shell of the present utility patent.

Optionally, in order to achieve stable installation of the fixed cover 102 at the opening on the top of the limited shell 104, referring to FIGS. 3, 4 and 6, a locking slot e is arranged on one side of inner side wall of the limited shell 104 which is close to the opening, and a locking piece 108 is arranged on the outer side wall of the fixed cover 102 to snap with the locking slot e. Optionally, two locking slots e are provided oppositely on the inner side wall of the limited shell 104, and two locking pieces 108 are provided on the outer side wall of the fixed cover 102 to correspond to the two locking slots e. The two locking slots 108 can snap with two locking slots e one by one. The locking piece 108 protrudes outward from the fixed cover 102 and is wedge-shaped.

The above only aims to illustrate the technical solution of the present utility patent without limitation. Any other modifications or equivalent replacements of the technical solution of the present utility patent made by ordinary skilled in the art should be included in the scope of the claims of the present utility patent as long as they do not deviate from the technical solution spirit and scope of the present utility patent.

The invention claimed is:

1. A Vehicle Cigarette Lighter Adapter (CLA) with Fan and USB Charger, comprising a charger body for use with a vehicle cigarette lighter jack, wherein the charger body comprises: a shell with an opening on the top, a fixed cover which is disposed at the opening of the shell, a plurality of first heat emission holes which are provided to run through the fixed cover, and a control circuit board and an adapter board which are arranged in the shell from top to bottom; wherein the adapter board is provided with several charging interfaces; the several charging interfaces pass through the side of the shell which is close to the fixed cover and/or through the fixed cover; there are gaps between the adapter board and the inner side wall of the shell and between the control circuit board and the inner side wall of the shell;

the shell further comprising a connecting shell inserted into the vehicle cigarette lighter jack; a limited shell which is integrally arranged on the top of the connecting shell and is used to limit at outside of the vehicle cigarette lighter jack; the fixed cover covers the opening at top of the limited shell, and a plurality of second heat emission holes are annularly penetrated on bottom of the limited shell, the adapter board is fixedly installed in the limited shell, and the control circuit board extends into connecting shell from the limited shell;

the vehicle charger further comprising a cooling fan arranged in the shell, wherein the cooling fan is electrically connected to the control circuit board, and the air outlet of the cooling fan faces to one side of the first heat emission holes; and wherein a fixed column is integrally arranged on the inner side wall of the limited shell, and the adapter board is fixed on the top of the fixed column, a limited slot penetrates the adapter board, and a limited block is protruding upward on the top of the control circuit board for insertion into the limited slot.

2. The Vehicle Cigarette Lighter Adapter (CLA) with Fan and USB Charger according to claim 1, wherein the cooling fan is arranged in the limited shell and is located above the adapter board, a cavity is arranged between the cooling fan and the adapter board to connect with the gap between the adapter board and the limited shell.

3. The vehicle charger according to claim 1, wherein an input electrode is provided on bottom of the connecting shell, and the input electrode is used with the vehicle cigarette lighter jack to realize power input.

4. The Vehicle Cigarette Lighter Adapter (CLA) with Fan and USB Charger according to claim 1, wherein a plurality of the charging interfaces respectively pass through the fixed cover and the limited shell.

5. The Vehicle Cigarette Lighter Adapter (CLA) with Fan and USB Charger according to claim 1, wherein at least two fixed columns are provided at intervals on the inner side wall of the limited shell, and a connecting piece is provided between the fixed columns and the limited shell.

6. The Vehicle Cigarette Lighter Adapter (CLA) with Fan and USB Charger according to claim 1, wherein a locking slot is arranged on one side of the inner side wall of the limited shell which is close to the opening, and a locking piece is arranged on the outer side wall of the fixed cover to snap with the locking slot.

\* \* \* \* \*